(12) United States Patent
Blanc

(10) Patent No.: US 10,329,123 B2
(45) Date of Patent: Jun. 25, 2019

(54) VIBRATION DAMPER FOR ELEVATOR LINEAR PROPULSION SYSTEM

(71) Applicant: Otis Elevator Company, Farmington, CT (US)

(72) Inventor: Arthur Blanc, Providence, RI (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 22 days.

(21) Appl. No.: 15/206,715

(22) Filed: Jul. 11, 2016

(65) Prior Publication Data

US 2017/0008737 A1 Jan. 12, 2017

Related U.S. Application Data

(60) Provisional application No. 62/190,611, filed on Jul. 9, 2015.

(51) Int. Cl.
| | | |
|---|---|---|
| *B66B 9/02* | (2006.01) | |
| *H02K 5/24* | (2006.01) | |
| *B66B 11/04* | (2006.01) | |
| *B66B 9/00* | (2006.01) | |

(52) U.S. Cl.
CPC .......... *B66B 11/0407* (2013.01); *B66B 9/003* (2013.01); *B66B 9/02* (2013.01); *H02K 5/24* (2013.01)

(58) Field of Classification Search
CPC ...... H02K 5/24; H02K 41/02; B66B 11/0407; F16F 1/3713; B60L 2270/145
USPC .......................................... 248/562; 238/382
See application file for complete search history.

(56) References Cited

U.S. PATENT DOCUMENTS

| | | | | |
|---|---|---|---|---|
| 3,873,077 A | * | 3/1975 | Jorn | F16F 1/26 267/152 |
| 4,781,365 A | * | 11/1988 | Harrison | B60G 7/04 248/634 |
| 4,978,581 A | * | 12/1990 | Fukahori | B32B 7/02 248/560 |
| 5,005,671 A | | 4/1991 | Aime et al. | |
| 5,027,925 A | | 7/1991 | Kahkipuro | |
| 5,033,588 A | | 7/1991 | Nakai et al. | |

(Continued)

FOREIGN PATENT DOCUMENTS

| | | |
|---|---|---|
| CN | 1537800 A | 10/2004 |
| CN | 203158979 U | 8/2013 |

(Continued)

OTHER PUBLICATIONS

Extended European Search Report for Application No. 16178845.0 dated Nov. 21, 2016.

(Continued)

*Primary Examiner* — Minh Truong
(74) *Attorney, Agent, or Firm* — Cantor Colburn LLP

(57) ABSTRACT

An elevator system may include a stationary support structure defining a hoistway; a car disposed in the hoistway; a linear propulsion assembly for applying a force to the car, the assembly including a first rail engaged to one of the support structure and the car, a plurality of magnets mounted to the first rail, a second rail co-extending with and spaced laterally from the first rail and engaged to the other of the support structure and the car, and a plurality of electric coils mounted to the second rail; and, a damper engaged to at least one of the first and second rails for dissipating vibration.

1 Claim, 6 Drawing Sheets

(56) References Cited

U.S. PATENT DOCUMENTS

| | | | |
|---|---|---|---|
| 5,325,937 A * | 7/1994 | Suchodolski | B66B 11/0273 187/401 |
| 5,547,059 A * | 8/1996 | Watanabe | B66B 11/0407 187/288 |
| 5,566,784 A | 10/1996 | Rennetaur | |
| 5,749,444 A * | 5/1998 | Skalski | B66B 7/044 187/292 |
| 6,189,657 B1 | 2/2001 | Jessenberger | |
| 6,402,044 B1 * | 6/2002 | Sato | E01B 5/08 238/382 |
| 6,498,417 B2 * | 12/2002 | Fuller | H02K 5/24 310/216.113 |
| 6,604,735 B2 * | 8/2003 | McCollough | F16F 1/373 267/140 |
| 6,628,027 B2 * | 9/2003 | Fuller | H02K 1/185 310/51 |
| 7,383,924 B2 | 6/2008 | Izumi et al. | |
| 7,628,251 B2 * | 12/2009 | Kocher | B66B 11/0407 187/277 |
| 8,040,014 B2 * | 10/2011 | Boardman, IV | H02K 1/185 310/216.129 |
| 8,720,937 B2 * | 5/2014 | Noble | F16F 1/373 267/140 |
| 2002/0040831 A1 | 4/2002 | Nakagaki et al. | |
| 2004/0216960 A1 | 11/2004 | Kocher et al. | |
| 2005/0087400 A1 * | 4/2005 | Zhou | B66B 11/0407 187/277 |
| 2009/0071759 A1 | 3/2009 | Yu et al. | |
| 2012/0211311 A1 * | 8/2012 | Piech | B66B 5/16 187/351 |
| 2012/0272612 A1 | 11/2012 | Peacock et al. | |
| 2013/0206514 A1 | 8/2013 | Kim et al. | |
| 2013/0270041 A1 * | 10/2013 | Loeser | B66B 11/0407 187/250 |
| 2017/0225927 A1 * | 8/2017 | Kirsch | B66B 11/0407 |

FOREIGN PATENT DOCUMENTS

| | | |
|---|---|---|
| JP | H061564 A | 1/1994 |
| JP | H0692572 A | 4/1994 |
| WO | 2014182272 A1 | 11/2014 |

OTHER PUBLICATIONS

Office Action from Chinese Patent Office for Application No. 201610542109.7 dated Feb. 1, 2019; 6 pages.

* cited by examiner

VIBRATION DAMPER FOR ELEVATOR LINEAR PROPULSION SYSTEM

CROSS REFERENCE TO RELATED APPLICATION

This application claims priority to U.S. Provisional Application No. 62/190,611 filed Jul. 9, 2015, the entire contents of which is incorporated herein by reference.

TECHNICAL FIELD

The subject matter disclosed herein relates generally to the field of elevators, and more particularly to a multicar, self-propelled elevator system having a linear propulsion system.

BACKGROUND

Self-propelled elevator systems, also referred to as ropeless elevator systems, are useful in certain applications (e.g., high rise buildings) where the mass of the ropes for a roped system is prohibitive and there is a desire for multiple elevator cars to travel in a single lane. There exist self-propelled elevator systems in which a first lane is designated for upward traveling elevator cars and a second lane is designated for downward traveling elevator cars. At least one transfer station is provided in the hoistway to move cars horizontally between the first lane and second lane.

Existing self-propelled elevators employ linear motors having secondary portions that include permanent magnets embedded in a rail-like structure. The secondary portions are typically under high dynamic forces due to the magnetic structures. These forces may induce vibrations that excite resonances (modes) of the structure. Any vibration may deform the secondary portion, which in turn affects air gap widths between moving structures that may negatively impact thrust and/or adversely impact ride quality.

BRIEF DESCRIPTION

According to one, non-limiting, embodiment, a linear propulsion assembly for imparting a force upon a car in a hoistway of an elevator system, the linear propulsion assembly comprises a primary portion constructed and arranged to mount to one of the car and the hoistway, the primary portion including a plurality of electric coils; a secondary portion constructed and arranged to mount to the other of the car and the hoistway, the secondary portion including a rail and plurality of magnets engaged to the rail and for moving the secondary portion with respect to the primary portion; and a leaf damper in contact with the rail for dissipating vibration.

In addition to one or more of the features described above or below, or as an alternative, further embodiments could include the rail including a first side through which the plurality of magnets are exposed and an opposite second side engaged to the leaf damper.

In addition to one or more of the features described above or below, or as an alternative, further embodiments could include the leaf damper being a composite that includes a plurality of layers.

In addition to one or more of the features described above or below, or as an alternative, further embodiments could include the leaf damper including a first non-magnetic layer and a first viscoelastic layer disposed between the second side and the non-magnetic layer.

In addition to one or more of the features described above or below, or as an alternative, further embodiments could include the leaf damper including a second non-magnetic layer directly engaged between the second side and the first viscoelastic layer.

In addition to one or more of the features described above or below, or as an alternative, further embodiments could include the leaf damper including a third non-magnetic layer and a second viscoelastic layer engaged directly between the first and third non-magnetic layers.

In addition to one or more of the features described above or below, or as an alternative, further embodiments could include the plurality of layers including a plurality of viscoelastic layers and a plurality of rigidity layers respectively interposed between the plurality of viscoelastic layers.

In addition to one or more of the features described above or below, or as an alternative, further embodiments could include the plurality of rigidity layers being made of aluminum.

In addition to one or more of the features described above or below, or as an alternative, further embodiments could include the plurality of rigidity layers being made at least in-part of plastic.

According to another, non-limiting, embodiment, an elevator system comprises a stationary support structure defining a hoistway; a car disposed in the hoistway; a linear propulsion assembly for applying a force to the car, the assembly including a first rail engaged to one of the support structure and the car, a plurality of magnets mounted to the first rail, a second rail co-extending with and spaced laterally from the first rail and engaged to the other of the support structure and the car, and a plurality of electric coils mounted to the second rail; and a damper engaged to at least one of the first and second rails for dissipating vibration.

In addition to one or more of the features described above or below, or as an alternative, further embodiments could include the damper being elongated and co-extending longitudinally with the first and second rails.

In addition to one or more of the features described above or below, or as an alternative, further embodiments could include the damper being passive and engaged to the first rail.

In addition to one or more of the features described above or below, or as an alternative, further embodiments could include the first rail being engaged to the car and the second rail being engaged to the support structure.

In addition to one or more of the features described above or below, or as an alternative, further embodiments could include the plurality of magnets being approximate to a first side of the first rail and the damper being adhered to an opposite second side of the first rail.

In addition to one or more of the features described above or below, or as an alternative, further embodiments could include the damper being a leaf damper.

In addition to one or more of the features described above or below, or as an alternative, further embodiments could include the damper including a plurality of viscoelastic layers and a plurality of stiffener layers with each viscoelastic layer adhered to at least one respective stiffener layer.

In addition to one or more of the features described above or below, or as an alternative, further embodiments could include the damper including a plurality of viscoelastic layers and a plurality of stiffener layers with each viscoelastic layer adhered to at least one respective stiffener layer.

In addition to one or more of the features described above or below, or as an alternative, further embodiments could include a plurality of brackets spaced longitudinally along the first rail with each bracket engaged between the car and the first rail, and wherein the damper extends longitudinally between two adjacent brackets of the plurality of brackets.

In addition to one or more of the features described above or below, or as an alternative, further embodiments could include each one of the plurality of stiffener and viscoelastic layers being about equal to or less than 1 mm thick.

BRIEF DESCRIPTION OF THE DRAWINGS

The foregoing and other features, and advantages of embodiments are apparent from the following detailed description taken in conjunction with the accompanying drawings in which.

DETAILED DESCRIPTION

Figure 1:
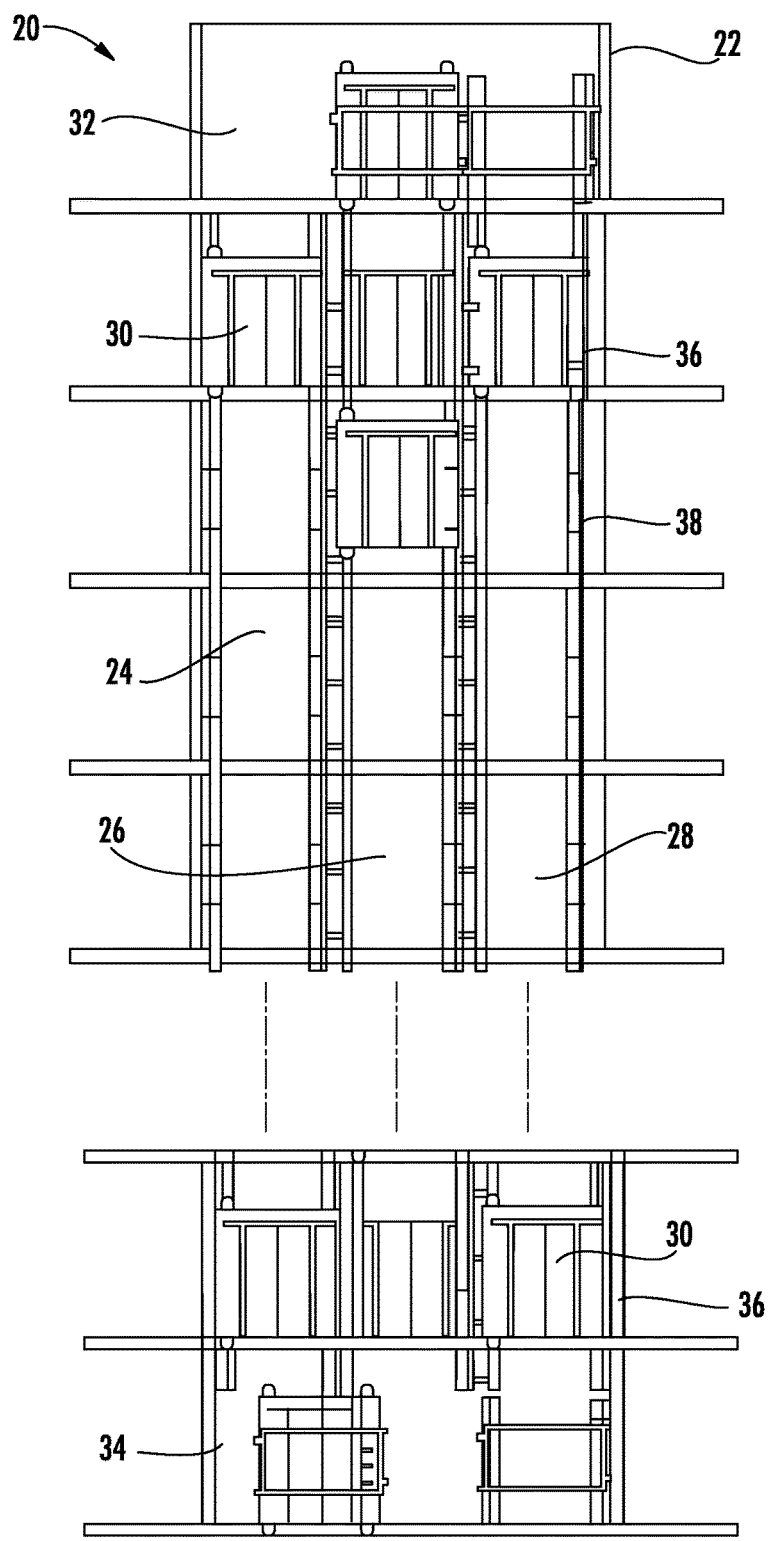
FIG. 1 is a side view of a multicar elevator system as one, non-limiting, exemplary embodiment of the present disclosure.

Referring to FIG. 1, an elevator system 20 may include a stationary support structure 22 that may generally be an integral part of a multi-story building, and at least one lane or hoistway (i.e., three hoistways 24, 26, 28 illustrated) having boundaries generally defined by the structure 22. The system 20 further includes at least one car 30 that travels within at least one of the hoistways 24, 26, 28. The car 30 may travel in a vertical direction, and may further be in a dedicated upward direction in hoistway 26 and a dedicated downward direction in hoistway 28 (as one, non-limiting, example). It is further contemplated and understood that the elevator system 20 may be self-propelled, and may have multiple cars 30 traveling in any one hoistway 24, 26, 28 with the multiple cars traveling in an upward direction in hoistway 26 and a downward direction in hoistway 28.

The elevator system 20 may further include upper and lower transfer stations 32, 34 generally located at or above the top floor and at or below the bottom floor, respectively. Both stations 32, 34 may impart horizontal movement of the cars 30, thereby facilitating transfer of the cars between hoistways 24, 26, 28. Although not shown in FIG. 1, one or more intermediate transfer stations, similar to stations 32, 34, may be used between the first floor and the top floor.

Figure 2:
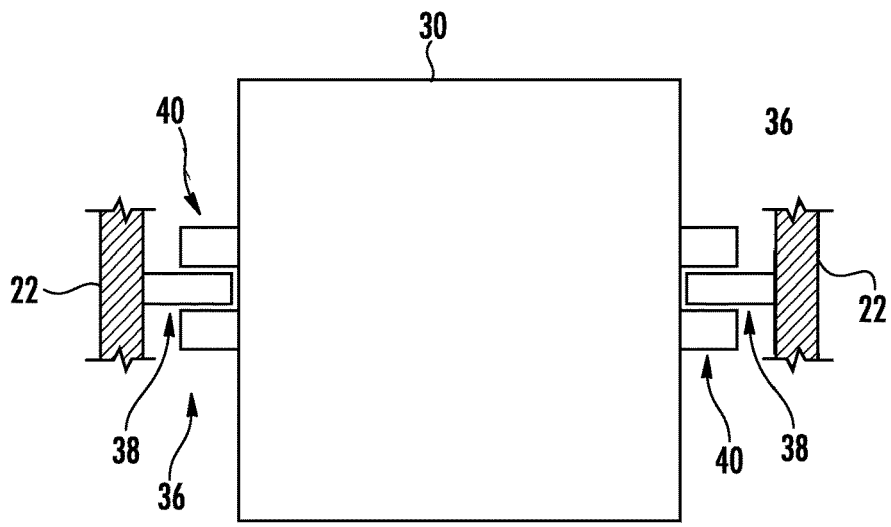
FIG. 2 is a top-down view of a car and portions of a linear propulsion assembly of the elevator system.

Referring to FIGS. 1 and 2, at least one linear propulsion assembly 36 of the elevator system 20 is generally engaged between the cars 30 and the stationary support structure 22. A magnetic field generated by the assembly 36 generally propels the cars 30 within the hoistways 24, 26, 28 and, potentially, the transfer stations 32, 34. Each car 30 may further be propelled with two assemblies 36 mounted between opposite sides of the car 30 and opposing walls of the support structure 22. Each assembly 36 may include a primary portion 38 engaged to the support structure 22, and two moving, secondary portions 40 engaged to the cars 30. The primary portion 38 may be located between and spaced laterally inward from the two secondary portions 40. Both portions 38, 40 are elongated and extend longitudinally in the direction of car travel. It is further contemplated and understood that positioning of the portions 38, 40 may be interchanged with the primary portion 38 engaged to the car 30 and the secondary portion 40 engaged to the support structure 22.

Figure 3:
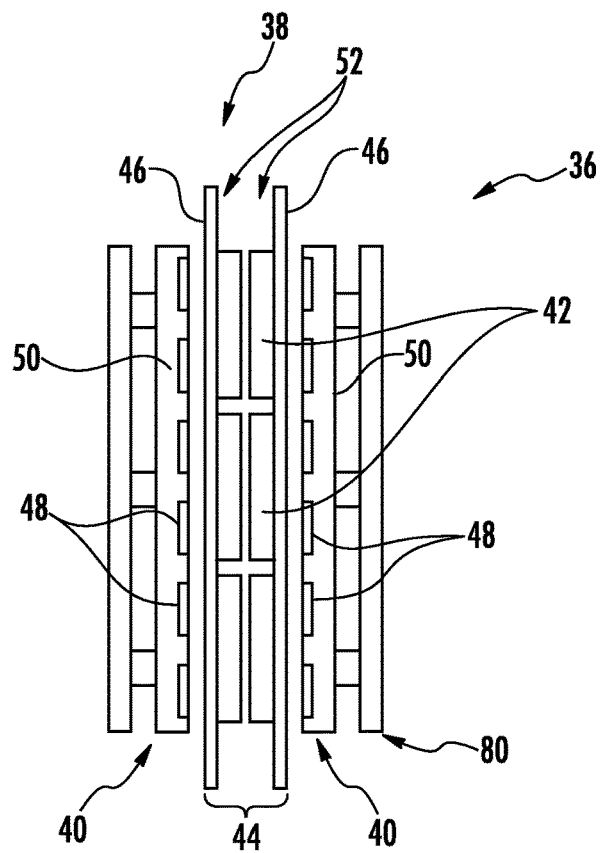
FIG. 3 is a partial side view of the linear propulsion assembly.

Referring to FIGS. 2 and 3, the primary portion 38 may include a plurality of electric windings or coils 42 and a rail 44 that extends along the direction of car travel. The rail 44 may be composed of a plurality of panels 46 for structural support and mounting of the coils 42. The coils 42 and panels 46 may be modular in form and may include any variety of configurations necessary to generate the magnetic flux that imparts force on the secondary portion 40 to move or hold the car 30. Each secondary portion 40 may include a plurality of permanent magnets 48 and a rail 50 for supporting the magnets. The rail 44 of the primary portion 38 may be spaced laterally between the rails 50 of the two secondary portions 40. It is further contemplated and understood that the rail 50 of the secondary portion 40 may be orientated between two rails 44 of the primary portion 38.

Figure 4:
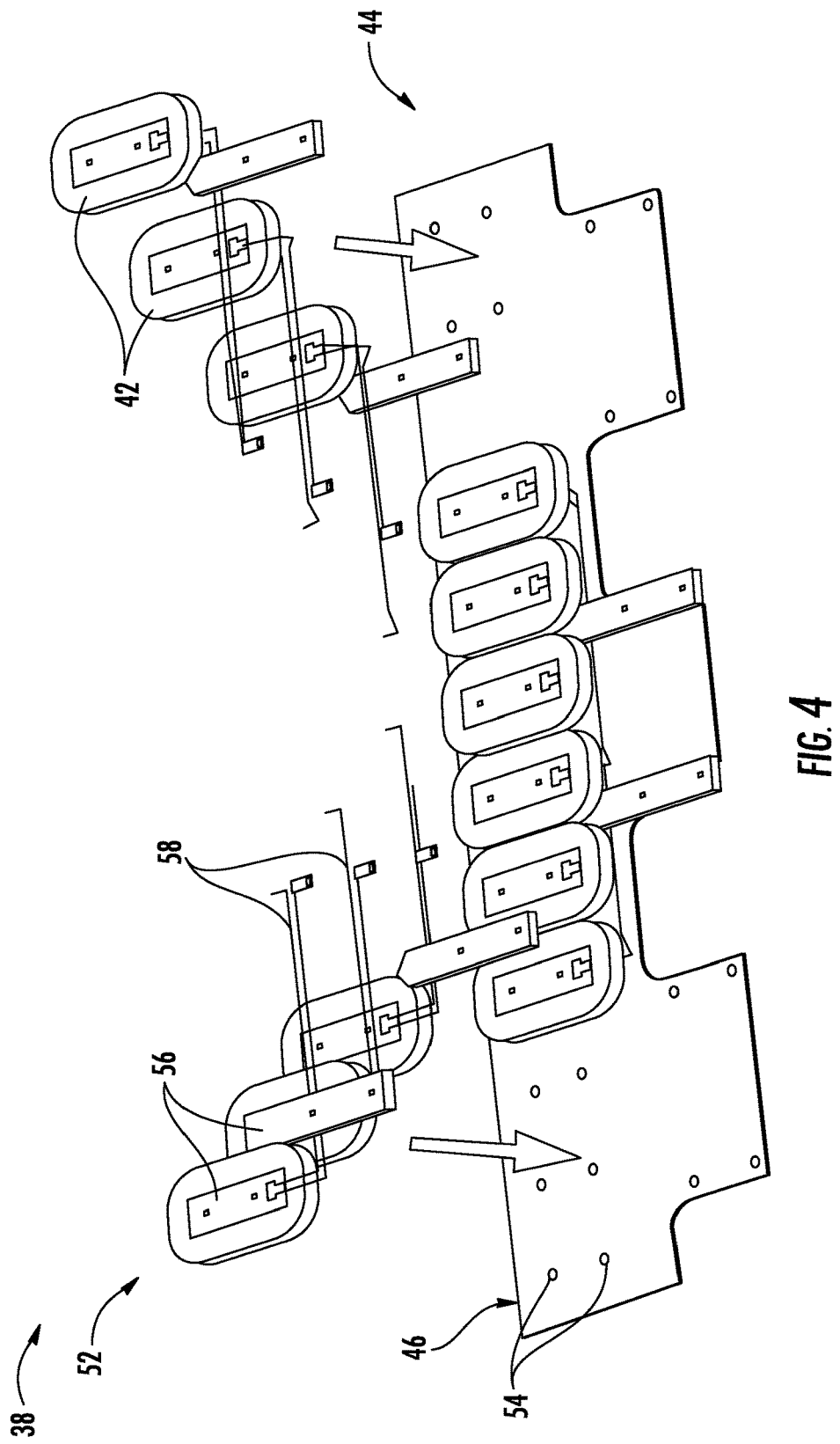
FIG. 4 is a partially exploded perspective view of a primary portion of the linear propulsion assembly.
Figure 5:
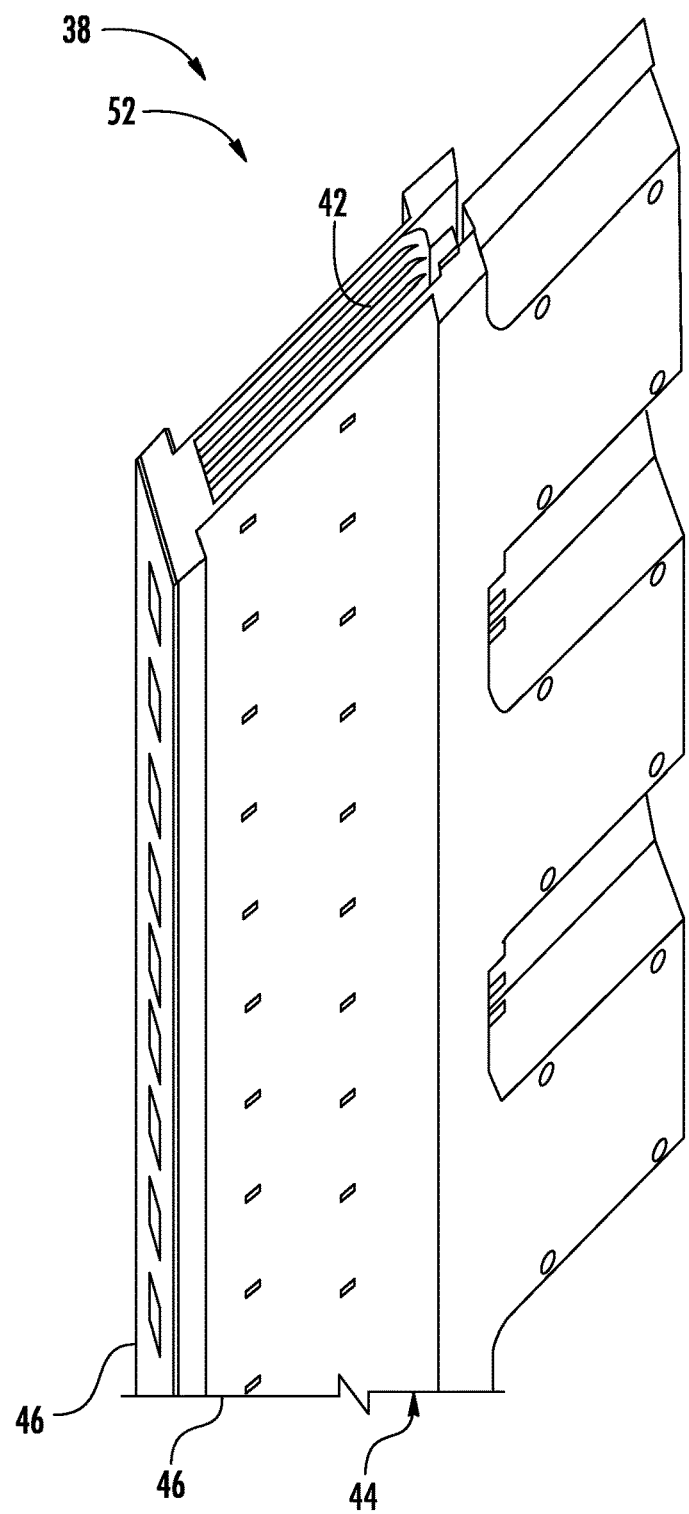
FIG. 5 is a perspective view of the primary portion.

Referring to FIGS. 4 and 5, the primary portion 38 may include a plurality of modular assemblies 52 with each assembly including at least one panel 46 of the rail 44 and a portion of the coils 42 supported by the panel. Two modular assemblies 52 may be arranged so that the coils 42 are adjacent to each other and positioned between two secondary portions 40 (see FIG. 3). Each panel 46 may include a plurality of mounting holes 54 formed therein. Coil cores 56 of the primary assembly 38 support the coils 42, and are secured at the mounting holes 54 via fasteners. Electrical conductors 58 extend from each coil 42 and may be routed through a common bus (not shown). The mounting panels 46 and coil cores 56 may be made from a non-conductive material, such as fiberglass, or plastic which may include fiber reinforced plastic.

Figure 6:
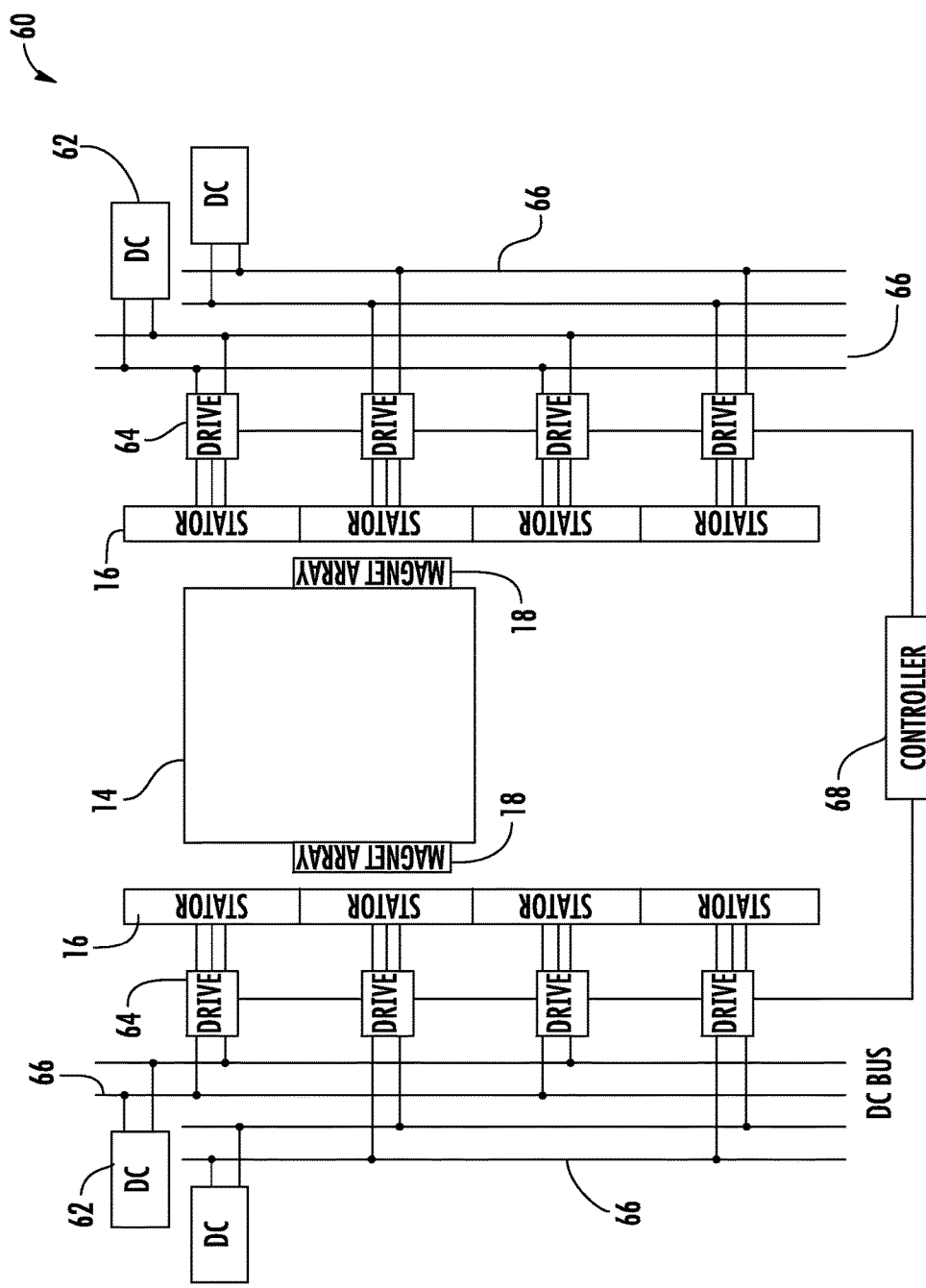
FIG. 6 is a schematic of a drive system of the elevator system.

Referring to FIG. 6 a schematic illustration of an exemplary embodiment of a drive system 60 of the elevator system 20 is shown. It is understood that other components (e.g., safeties, brakes, etc.) are not shown in FIG. 6 for ease of illustration. The drive system 60 includes one or more power sources 62 coupled to one or more drives 64 via one or more buses 66. The power sources 62 are DC power sources, but embodiments are not limited to using DC power. DC power sources 62 may be implemented using storage devices (e.g., batteries, capacitors), and may be active devices that condition power from another source (e.g., rectifiers). Drives 64 receive DC power from the DC buses 66 and provide drive signals to the primary portions 38 of the linear propulsion assembly 36. Each drive 64 may be a converter that converts DC power from DC bus 66 to a multiphase (e.g., three phase) drive signal provided to a respective section of the primary portions 38. The primary portion 38 may be divided into the plurality of modular assemblies 52, with each assembly associated with a respective drive 64.

A controller 68 provides control signals to the each of the drives 64 to control generation of the drive signals. Controller 68 may use pulse width modulation (PWM) control signals to control generation of the drive signals by drives 64. Controller 68 may be implemented using a processor-based device programmed to generate the control signals. Controller 68 may also be part of an elevator control system or elevator management system. Elements of FIG. 6 may be implemented in a single, integrated module, and/or be distributed along the hoistways 24, 26, 28.

Figure 7:
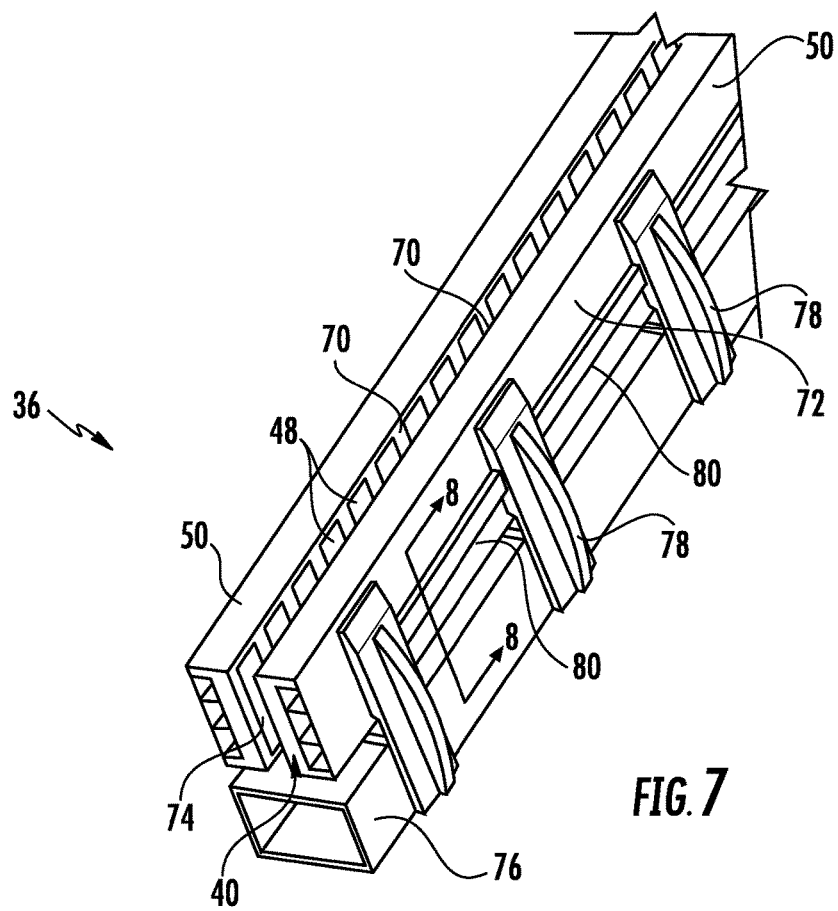
FIG. 7 is a partial perspective view of two secondary portions, a mounting member and brackets of the linear propulsion assembly.
Figure 8:
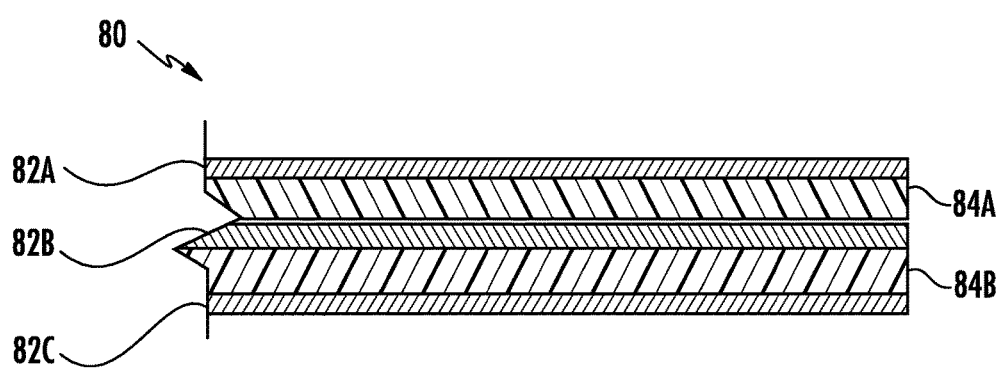
FIG. 8 is a cross section of a leaf damper of the linear propulsion assembly taken from line 8-8 in FIG. 7.

Referring to FIGS. 7 and 8, two opposing secondary portions 40 are illustrated each having a rail 50 and a plurality of permanent magnets 48. The rails 50 are substantially parallel to one-another and each have first side 70 and an opposite second side 72. The magnets 48 are approximate to the first side 70 and may be exposed there-through. The first sides 70 of the rails 50 of each portion 40 are spaced from and oppose one-another thereby defining a gap 74 for receipt of at least a part of the primary portion 38. The width of the gap 74 (i.e., distance between the opposing first sides) is generally greater than the width of the primary portion 38 for maintaining an air space between the sides 70 and the panels 46 of the primary portion 38.

The linear propulsion assembly 36 may further have an elongated mounting member 76 that co-extends with the rails 50, and a plurality of brackets 78 for securing both secondary portions 40 to the car 30. More specifically, the member 76 may secure directly to the car 30, and the brackets 78 may secure both of the rails 50 to the common member 76. Each bracket 78 may be spaced longitudinally along the rails from the next adjacent bracket and may be engaged directly to the second side 72 of each rail 50. The brackets 78 facilitate proper positioning of the rails 50 and add a degree of structural rigidity to maintain a consistent width of the gap 74. It is further contemplated and understood that the rail 50 of the secondary portion 40 may be orientated between two rails 44 of the primary portion 38.

The secondary portion 40 includes a plurality of leaf dampers 80 that dissipate vibration energy in shear (i.e., as the secondary portion 40 tries to flex) caused by the high dynamic forces due to the magnetic structures. Each damper 80 may be in contact with and/or adhered to the second side 72 of the rail 50; may be located between respective brackets 78; and, may co-extend longitudinally with the rail 50. Opposite ends of each damper 80 may be contoured to form over at least a portion of the brackets 78 (not shown), or, may be located adjacent to the respective brackets.

The leaf damper 80 may include three rigid layers 82A, 82B, 82C that add a degree of structural rigidity and/or stiffness, and two viscoelastic layers 84A, 84B for dissipating vibration. Combined, all of the layers 82, 84 generally form a composite structure (i.e., sandwiching of different layers). The rigid layer 82A has a first side that may be adhered to the second side 72 of the rail 50, and an opposite second side that adheres to the viscoelastic layer 84A. The viscoelastic layer 84A is located between and may be directly engaged to the adjacent rigid layers 82A, 82B. The viscoelastic layer 84B is located between and may be directly engaged to the adjacent rigid layers 82B, 82C. The viscoelastic layers 84 are made of a generally rubber-like material (e.g., elastomers such as urethane, thermoplastic vinyls, sorbothane, and others), and the rigid layers 82 may be made of a non-magnetic material such as, for example, an aluminum or a plastic composite material. Each layer 84 may be about equal to or less than one millimeter thickness. It is further contemplated and understood that the number of layers 82, 84 may be less or more than that illustrated and the dimensions such as layer thickness and width are dependent upon a specific application while attempting to reduce or minimize overall weight and packaging volume. It is also understood that the leaf damper 80 may be applied to any variety of locations on either rails 44, 50.

In operation, the leaf damper 80 dissipates vibration enenergy in shear and the added thickness of the leaf damper adds flexural stiffness to the rail 50, reducing the overall vibration of the secondary portion 40 of the linear propulsion assembly 36. During operation of the elevator system 20, the secondary portions 40 of the assembly 36 are placed under high dynamic forces due to the magnetic structures. The leaf dampers 80 function to attenuate or dissipate resonating vibrations that would otherwise be created by the forces. Therefore, as the car 30 accelerates, the leaf dampers 80 prevent or greatly minimize any vibration resonances placed upon the secondary portions 40. Without such vibrational displacement, the rails 50 will not appreciably deform, and in-turn, the gap 74 width is maintained. With a consistent gap width, thrust of the car 30 is not impaired and ride quality is optimized.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. An elevator system comprising:
a stationary support structure defining a hoistway;
a car disposed in the hoistway;
a linear propulsion assembly for applying a force to the car, the assembly including a first rail engaged to one of the support structure and the car, a plurality of magnets mounted to the first rail, a second rail co-extending with and spaced laterally from the first rail and engaged to the other of the support structure and the car, and a plurality of electric coils mounted to the second rail;
a passive leaf damper engaged to the first rail for dissipating vibration, the leaf damper including a plurality of viscoelastic layers and a plurality of stiffener layers with each viscoelastic layer adhered to at least one respective stiffener layer, wherein the plurality of magnets are approximate to a first side of the first rail and the leaf damper is directly adhered to a second side of the first rail that faces in an opposite direction from the first side, and the first rail is engaged to the car and the second rail is engaged to the support structure, and
a plurality of brackets spaced longitudinally along the first rail with each bracket engaged between the car and the first rail, and wherein the leaf damper includes a width and a length and the length extends longitudinally between two adjacent brackets of the plurality of brackets.

* * * * *